(12) United States Patent
Bhambri et al.

(10) Patent No.: US 7,548,889 B2
(45) Date of Patent: Jun. 16, 2009

(54) PAYMENT INFORMATION SECURITY FOR MULTI-MERCHANT PURCHASING ENVIRONMENT FOR DOWNLOADABLE PRODUCTS

(75) Inventors: Vikram Bhambri, Redmond, WA (US); Deirdre L. Walsh, Bellevue, WA (US); Paul C. Sausville, Issaquah, WA (US); Raj Biyani, Bellevue, WA (US); Thomas L. Button, Woodinville, WA (US); Sean Nolan, Bellevue, WA (US); Susan Warren, Point Richmond, CA (US); Matthew D. Hempey, Novato, CA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 11/042,305

(22) Filed: Jan. 24, 2005

(65) Prior Publication Data

US 2006/0167819 A1 Jul. 27, 2006

(51) Int. Cl.
*H04L 9/00* (2006.01)
*G07G 1/12* (2006.01)
*G06F 7/06* (2006.01)

(52) U.S. Cl. ............................... 705/64; 705/65; 705/50
(58) Field of Classification Search .................... 705/44
See application file for complete search history.

(56) References Cited

U.S. PATENT DOCUMENTS

| | | | | |
|---|---|---|---|---|
| 5,671,279 A | * | 9/1997 | Elgamal | 705/79 |
| 5,727,163 A | * | 3/1998 | Bezos | 705/27 |
| 5,790,677 A | * | 8/1998 | Fox et al. | 705/78 |
| 5,826,245 A | * | 10/1998 | Sandberg-Diment | 705/44 |
| 6,000,832 A | * | 12/1999 | Franklin et al. | 700/232 |
| 6,073,124 A | * | 6/2000 | Krishnan et al. | 705/59 |
| 6,270,011 B1 | * | 8/2001 | Gottfried | 235/379 |
| 6,363,363 B1 | * | 3/2002 | Haller et al. | 705/40 |
| 6,385,596 B1 | * | 5/2002 | Wiser et al. | 705/51 |
| 6,535,880 B1 | | 3/2003 | Musgrove et al. | |
| 6,560,581 B1 | * | 5/2003 | Fox et al. | 705/51 |
| 7,024,395 B1 | * | 4/2006 | McCown et al. | 705/65 |
| 7,107,242 B1 | * | 9/2006 | Vasil et al. | 705/39 |
| 7,162,443 B2 | * | 1/2007 | Shah | 705/26 |

(Continued)

OTHER PUBLICATIONS

Pavlou, P.A., Gefen, D., Building effective online marketplaces with institution based trust, Inst. Oper. Res. & Management Sciences, USA, Mar. 2004, p. 37-59.*

(Continued)

*Primary Examiner*—Calvin L Hewitt, II
*Assistant Examiner*—James D Nigh

(57) ABSTRACT

A multi-merchant purchasing system is configured to identify downloadable products selected by a user for purchase. The identified downloadable products are offered by multiple merchants. The multi-merchant purchasing system enables the user to purchase all of the downloadable products in a single transaction. Specifically, the multi-merchant purchasing system determines payment information associated with the user and, with minimum user-interaction, sends the payment information to applications associated with the merchants for processing. The multi-merchant purchasing system may also be configured to receive purchase information from the merchant applications and maintains the purchase information for the user in a locker. The multi-merchant purchasing system may further be configured to automatically download and install the purchased product onto the user's computing device through a software assistant. To ensure privacy and security, the multi-merchant purchasing system may include a credit card quarantine module to secure credit card data by encoding and multiple levels of encryptions.

15 Claims, 20 Drawing Sheets

U.S. PATENT DOCUMENTS

| | | | |
|---|---|---|---|
| 7,188,081 B1 * | 3/2007 | Shah | 705/26 |
| 7,194,759 B1 * | 3/2007 | Chess et al. | 726/2 |
| 7,333,956 B2 * | 2/2008 | Malcom | 705/50 |
| 7,343,322 B1 * | 3/2008 | Mulderry et al. | 705/26 |
| 2002/0032662 A1 * | 3/2002 | Maclin et al. | 705/64 |
| 2002/0069174 A1 * | 6/2002 | Fox et al. | 705/52 |
| 2002/0069176 A1 | 6/2002 | Newman | |
| 2002/0069177 A1 * | 6/2002 | Carrott et al. | 705/64 |
| 2002/0123972 A1 * | 9/2002 | Hodgson et al. | 705/72 |
| 2002/0131600 A1 * | 9/2002 | Ionescu | 380/277 |
| 2003/0105965 A1 * | 6/2003 | Challener | 713/184 |
| 2003/0182241 A1 * | 9/2003 | Everhart | 705/65 |
| 2004/0054596 A1 | 3/2004 | Meinhardt | |
| 2004/0193553 A1 * | 9/2004 | Lloyd et al. | 705/78 |
| 2004/0230536 A1 * | 11/2004 | Fung et al. | 705/64 |
| 2004/0243496 A1 * | 12/2004 | Kim et al. | 705/35 |
| 2005/0004876 A1 * | 1/2005 | Movalli et al. | 705/64 |
| 2005/0055317 A1 * | 3/2005 | Carrott et al. | 705/67 |

OTHER PUBLICATIONS

Mainframe, (business methods mandatory database search), 87 pages.*

Billard D., "Multipurpose Internet Shopping Basket", Proceedings International Workshop on Database and Expert Systems Applications, Aug. 1998, pp. 685-690.

European Patent Office, "European Search Report", for European Patent Aplication No. 05028233.4, Mar. 9, 2006, The Hague.

* cited by examiner 1502  1500

| 1. Billing Information | 2. Confirm Order | 3. Download Software |

Thank you for shopping at Marketplace

Purchase Summary

| Digital River, 9/24/2004 | Product | Transaction ID | Status | Price Paid | Tax Paid |
|---|---|---|---|---|---|
| VISA ending in -4523 | TurboTax Premier | 1234567890 | OK | 49.90 | 0.00 |
| Subtotal: 75.83 | GRE Prep Course | 1234567890 | OK | 25.93 | 0.00 |
| Tax: 0.00 | | | | | |
| Total: 75.83 | Get a Receipt    Support    Return a Product | | | | |

| Amazon, 9/24/2004 | Product | Transaction ID | Status | Price Paid | Tax Paid |
|---|---|---|---|---|---|
| VISA ending in -4523 | Norton AntiVirus 2004 Professional | 1345678902 | OK | 27.11 | 0.00 |
| Subtotal: 27.11 | | | | | |
| Tax: 0.00 | | | | | |
| Total: 27.11 | Get a Receipt    Support    Return a Product | | | | |

Software ready for download

Click 'Download' to begin downloading a specific title or 'Download All' to download all of your purchases Your previous software purchases are available for download in your Software Locker.

| | Title | Download Time | License Information | |
|---|---|---|---|---|
| Digital River | TurboTax Premier Home & Business for Windows | ~5 min. (T1) ~18 min. (56k) | License key ACE56KH234X55 | [Download] |
| | GRE Prep Course | ~2 min. (T1) ~12 min. (56k) | License key SJJEBBB29371 | [Download] |
| amazon.com | Norton AntiVirus 2004 Professional Edition | ~8 min. (T1) ~24 min. (56k) | License Key BHD3-AA45-XXX3-HKXY-5HA3 | [Download] |

[Download All]

| | | | | | | |
|---|---|---|---|---|---|---|
| Software Locker | Purchases | Account / Preferences | | | | 1800 |

Purchases
susanmwarren@hotmail.com

| Digital River, 9/24/2004 | Product | Transaction ID | Status | Price Paid | Tax Paid |
|---|---|---|---|---|---|
| VISA ending in -4523 | TurboTax Premier | 1234567890 | OK | 49.90 | 0.00 |
| Subtotal: 75.83 | GRE Prep Course | 1234567890 | OK | 25.93 | 0.00 |
| Tax: 0.00 | Get a Receipt   Support   Return a Product | | | | |
| Total: 75.83 | | | | | |

| Amazon, 9/24/2004 | Product | Transaction ID | Status | Price Paid | Tax Paid |
|---|---|---|---|---|---|
| VISA ending in -4523 | Norton AntiVirus 2004 Professional | 1345678902 | OK | 27.11 | 0.00 |
| Subtotal: 27.11 | | | | | |
| Tax: 0.00 | Get a Receipt   Support   Return a Product | | | | |
| Total: 27.11 | | | | | |

| Microsoft, 9/24/2004 | Product | Transaction ID | Status | Price Paid | Tax Paid |
|---|---|---|---|---|---|
| VISA ending in -4523 | Microsoft Plus! Digital Media Edition | 1234567890 | OK | 19.95 | 0.00 |
| Subtotal: 19.95 | | | | | |
| Tax: 0.00 | Get a Receipt   Support   Return a Product | | | | |
| Total: 19.95 | | | | | |

Account / Preferences susanmwarren@hotmail.com

Use this page to manage your preferences and personal information used by Metro.

Credit Cards

| EDIT | | TYPE | NUMBER | EXPIRES |
|---|---|---|---|---|
| edit | delete | VISA | Ends in -4523 | 01/05 * |
| edit | delete | AMEX | Ends in -6634 | 07/08 |
| edit | delete | MASTER CARD | Ends in -9033 | 01/05 |

Add / Edit Credit Card  [Save Credit Card]

- Cardholder's Name: [ ]
- Credit Card Type: [VISA]
- Credit Card Number: [ ]
- Credit Card Expiration: [January] [2004]
- Billing Address: [-- Use saved address --]

Preferences  [Save Preferences]

Choose the method you prefer to use to download software from your Software Locker. More info
- ◉ Use Metro Assistant
- ○ Use browser File Download dialog Please enter the address we should send confirmation email messages to. *This field is required.*

Contact Email [ ]

We want to stay in touch, but only in ways you find helpful. Check the box below if you'd like us to tell you about special offers, updates and services related to Metro.

☑ Send me Metro News via email

- Address 1: [ ]
- Address 2 (optional): [ ]
- City: [ ]
- State / Province: [ ]
- ZIP / Postal: [ ]
- Country: [United States]
- Phone (optional): [ ]

PAYMENT INFORMATION SECURITY FOR MULTI-MERCHANT PURCHASING ENVIRONMENT FOR DOWNLOADABLE PRODUCTS

CROSS-REFERENCE TO RELATED APPLICATION(S)

This application is related to the following U.S. Patent Applications, filed on the same date as this application, and the content of which is hereby incorporated by reference.

U.S. patent application, Ser. No. 11/042916, titled "MULTI-MERCHANT PURCHASING ENVIRONMENT FOR DOWNLOADABLE PRODUCTS", Docket No. MS#310299.01.

U.S. patent application, Ser. No. 11/042769, titled "SOFTWARE ASSISTANT FOR MULTI-MERCHANT PURCHASING ENVIRONMENT FOR DOWNLOADABLE PRODUCTS", Docket No. MS#310300.01.

U.S. patent application, Ser. No. 11/042932, titled "PRODUCT LOCKER FOR MULTI-MERCHANT PURCHASING ENVIRONMENT FOR DOWNLOADABLE PRODUCTS", Docket No. MS#310301.01.

BACKGROUND

As more and more businesses invest in online commerce infrastructure, purchasing products on the Internet continues to gain popularity among consumers. Shopping online has many advantages. For example, one advantage is that a consumer can browse, research and purchase products in an efficient manner without expending the time and effort of visiting physical stores. Another advantage is that online stores do not have the limitation of retail space and tend to have a better selection of products than physical stores.

One popular way for consumers to shop online is to visit an online equivalent of a department store. While an online department store may offer a variety of different products, the store often carries only products that are deemed to be profitable relative to business constraints, such as inventory, profit margins, etc. Consequently, the selection of products in any particular area may be limited. Also, an online department store may not be able to offer the best price for all of the products that it carries. Thus, if a consumer wants to purchase a particular product and at the best price, the consumer may have to visit multiple online department stores and specialty stores, which can be a time-consuming process.

To provide a better online shopping experience for consumers, many shopping services enable consumers to compare prices on products available on the Internet. These shopping services typically allow a consumer to search for a particular product that is offered by multiple stores and provide prices of the products at each store for comparison. In the comparison page, the price for each store is generally followed by a link to the store. A consumer may follow the link to visit the selected store and purchase the product. Although shopping services provide more selection and better prices for products, purchasing multiple products in this manner often involves substantial effort and is time-consuming. In particular, a consumer typically has to go through multiple purchasing processes.

An efficient way for consumers to purchase products from multiple merchants continues to elude those skilled in the art.

DESCRIPTION OF THE DRAWINGS

These and other features and advantages of the present invention will be better understood from the following detailed description read in light of the accompanying drawings, wherein:

FIG. 15 is a screenshot of an example user interface for managing downloadable products newly purchased through a multi-merchant purchasing system.

FIG. 17 is a screenshot of an example user interface provided by a locker of a multi-merchant purchasing system.

FIG. 18 is an example screenshot of a user interface provided by a multi-merchant purchasing system for a user to review purchases made with the system.

FIG. 19 is an example screenshot of a user interface provided by a multi-merchant purchasing system for a user to manage an account on the system.

DETAILED DESCRIPTION

The systems, methods, and data structure described herein relates to an environment for purchasing items from multiple merchants. A multi-merchant purchasing system is configured to identify downloadable products selected by a user for purchase. The identified downloadable products are offered by multiple merchants. Typically, the user would have to make separate purchases with each of merchants and go through multiple purchasing processes. The multi-merchant purchasing system enables the user to purchase all of the downloadable products in a single transaction. Specifically, the multi-merchant purchasing system determines payment information associated with the user and, with minimum user-interaction, sends the payment information to applications associated with the merchants for processing. The multi-merchant purchasing system may also be configured to receive purchase information from the merchant applications and maintains the purchase information for the user in a locker. The multi-merchant purchasing system may further be configured to automatically download and install the purchased product onto the user's computing device through a software assistant. To ensure privacy and security, the multi-merchant purchasing system may include a credit card quarantine module to secure credit card data by encoding and multiple levels of encryptions. These and other aspects of the multi-merchant purchasing system will be discussed below in detail.

Figure 1:
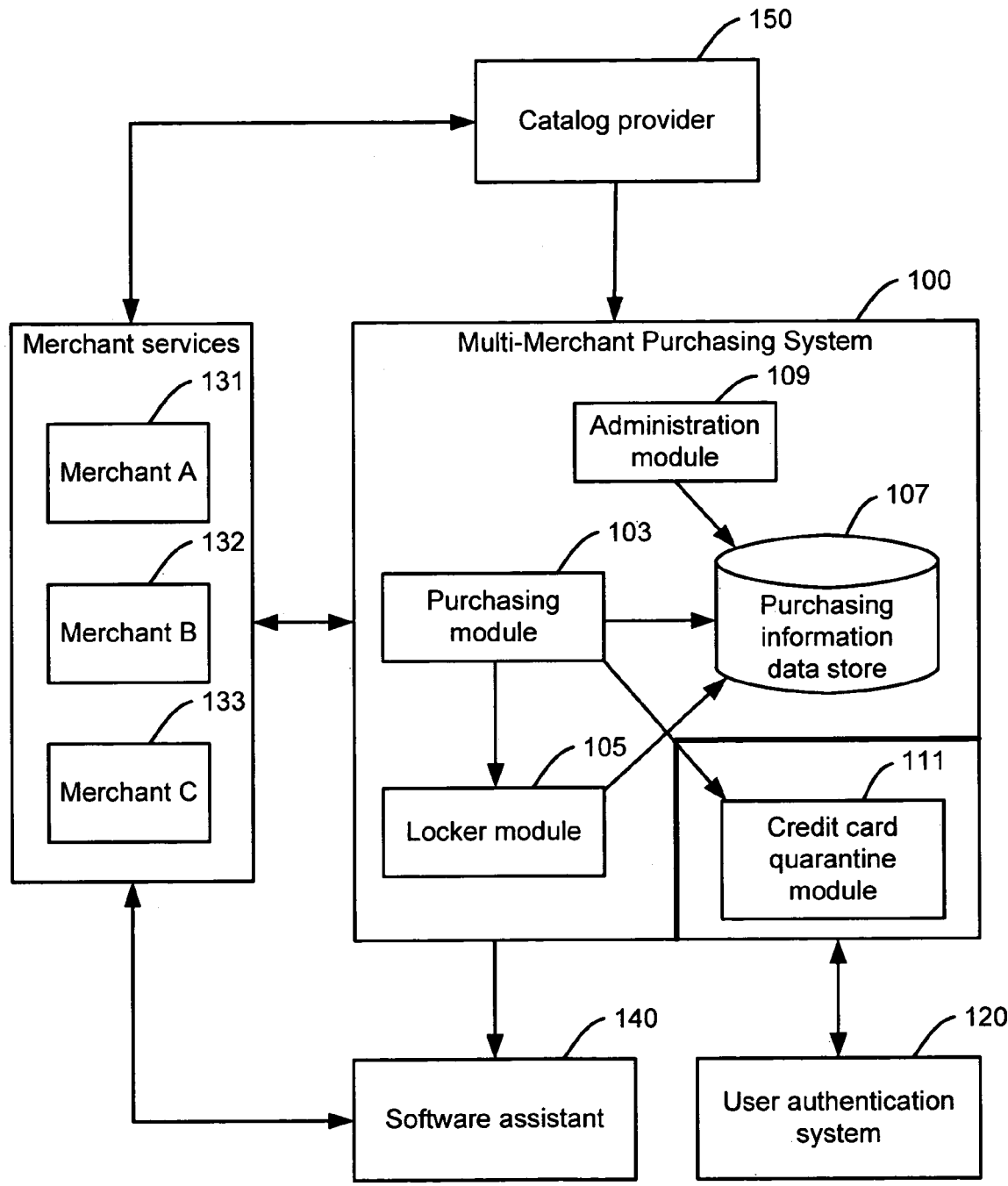
FIG. 1 shows an example multi-merchant purchasing system and related components.

FIG. 1 shows an example multi-merchant purchasing system 100 and related components. Multi-merchant purchasing system 100 provides a centralized experience for a user/consumer to purchase, download, and manage products from multiple merchants. Multi-merchant purchasing system 100 may interact with multiple catalog providers, such as catalog provider 150, and to manage the purchasing aspects of a user's online shopping experience. Multi-merchant purchasing system 100 may also interact with merchant services 131-133 to obtain updated product information from merchants and to provide payment information to the merchants. Multi-merchant purchasing system 100 may interact with a user authentication system 120 to authenticate users before providing services. Multi-merchant purchasing system 100 may further interact with a software assistant 140 to provide content of purchased products for downloading and installation onto a user's device.

Catalog provider 150 is configured to provide an online shopping environment for users from which to select products. Catalog provider 150 typically includes a website that offers information about products from multiple merchants. Catalog provider 150 may be configured to interact with merchant services 131-133 to acquire and update information about the products.

Catalog provider 150 may be configured to enable a user to select products from different merchants for purchasing with a shopping cart utility. The utility may include a list of the selected products and some basic information about the products, such as the merchants that offer the products, the product serial numbers, or the like. When the user chooses to purchase the selected products, catalog provide 150 may be configured to provide information of the shopping cart utility to multi-merchant purchasing system 100, which handles the purchasing process. Although only catalog provider 150 is shown in FIG. 1, it is to be appreciated that multi-merchant purchasing system 100 may be configured to handle purchases from multiple catalog providers.

For ease of discussion, multi-merchant purchasing system 100 is illustrated as logical components and modules. As shown in FIG. 1, multi-merchant purchasing system 100 may include purchasing module 103, locker module 105, credit card quarantine module 111, administration modules 109, and purchasing information data store 107.

Purchasing module 103 is configured to handle the purchasing aspects of the functionalities provided by multi-merchant purchasing system 100. Purchasing module 103 presents a user-interface for a user to purchase downloadable products from multiple merchants with a single transaction. Particularly, purchasing module 103 enables a user to purchase downloadable products from multiple merchants by going through the purchasing process only once. For example, multi-merchant purchasing system 100 enables the user to purchase products from each of the merchants corresponding to merchant services 131-133 by presenting the purchases to the user as a single transaction.

Purchasing module 103 is configured to receive from other services, such as catalog provider 150, shopping cart information that identifies downloadable products to be purchased by a user. Purchasing module 103 may interact with user authentication system 120 to authenticate the user prior to the purchasing process. The shopping cart information typically includes a list of the selected products to be purchased, the merchants that offer the products, serial numbers, availability, prices, or other basic information about the products.

Catalog provider 150 typically allows merchant services 131-133 to provide product information in a periodic basis. Thus, depending on timing, the shopping cart information provided by catalog provider 150 to purchasing module 103 may not be up to date. If necessary, purchasing module 103 is configured to interact with merchant services 131-133 to obtain updated certain information about the product, such as availability, pricing, or the like.

To perform the purchasing process, purchasing module 103 typically prompts the user to provide transactional information related to purchasing the downloadable products, such as personal information, shipping information, payment information, or the like. Multi-merchant purchasing system 100 typically does not handle payment transactions. Purchasing module 103 is configured to provide the transactional information to merchant services 131-133 for purchasing downloadable products from each of the merchants. Before allowing the user to provide the transactional information, multi-merchant purchasing system 100 is configured to alert the user that the provided information will be sent to the merchants for processing. Purchasing module may also be configured to record the transactional information for the user and apply the information for subsequent purchases without asking to user to provide the information again.

Upon receiving credit card payment information from the user, purchasing module 103 may be configured to safeguard the credit card number by immediately sending the number to credit card quarantine module 111. To ensure security, purchasing module 103 may also be configured to immediately delete any records of the credit card number. Purchasing module 103 is configured to receive a token from credit card quarantine module 111 to represent the credit card number. The token may be stored along with other credit card information for the user in purchasing information data store 107. To provide payment information of the user to a merchant, purchasing module 103 is configured to send the token to credit card quarantine module 111 along an identifier of the merchant. In response, purchasing module 103 receives from credit card quarantine module 111 a credit card number that is encrypted with a public key associated with the merchant to which the number will be forwarded. Purchasing module 103 is configured to provide the encrypted credit card number to the merchant service associated with the merchant along with other transactional information.

After a payment transaction has been completed by a merchant service for the purchase of a downloadable product, purchasing module 103 is configured to receive purchasing information related to the purchased product from the merchant service. Purchasing information may include license information of the product, key to activate the product, warranty, support, or the like. Purchase module 103 is configured to store the purchasing information in the purchasing information data store 107.

Locker module 105 enables users to manage and access downloadable products purchased through multi-merchant purchasing system 100. Locker module 105 is configured to interact with purchasing information data store 107 to retrieve purchasing information associated with the users. Locker module 105 may provide various types of information about purchased products to the users, such as license information of the products, purchase history, estimated downloading time for the products, warranty information, or the like.

Locker module 105 is configured to interact with software assistant 140 to enable a user to download a newly purchased product. Subsequent to the initial downloading, depending on the license acquired, locker module 105 may enable the user to perform other processes related to the downloadable product, such as repeated downloading of the product, downloading the product onto another computer, or the like. In one embodiment, locker module 105 retains information of all purchased products associated with a user's computing device. Locker module 105 may enable to the user to automatically download and install the purchased products onto the computer device through software assistant 140. Locker module 105 is configured to enable software assistant 140 to download products from a link provided by merchant services 131-133, but is not typically configured to provide the content of the downloadable product directly to software assistant 140.

Credit card quarantine module 111 is configured to store and safeguard credit card numbers for multi-merchant purchasing system 100. Credit card quarantine module 111 may be implemented as a part of the multi-merchant purchasing system 100 or as a separate component. Credit card quarantine module 111 is configured to receive credit card number from purchasing module 103 and to prevent the number from being sent out without encryption. Credit card quarantine module 111 is configured to generate tokens for each received credit card number and to associate each number with the corresponding token. The tokens are provided to purchasing module 103 for storing with other information associated with the user and a particular transaction. Credit card quarantine module 111 may also determine public/private key pairs where each pair of keys corresponds to each merchant associated with multi-merchant purchasing system 100. Credit card quarantine module 111 is configured to provide each private key to the corresponding merchant and to encrypt credit card numbers with the corresponding public key before sending the numbers to the merchant.

Purchase information data store 107 typically includes purchase information associated with transactions for each user. Purchase information data store 107 may be implemented as a database system for use by components of multi-merchant purchasing system 100. For example, purchase information data store 107 may be implemented as a Structured Query Language (SQL) database system. Administrative module 109 is configured to allow a system administrator to maintain multi-merchant purchasing system 100. For example, administrative module 109 may enable a system administrator to manage purchasing information data store 107.

User authentication system 120 is configured to enable a user to be authenticated prior to purchasing downloadable products on multi-merchant purchasing system 100. Any type of user authentication system may be used. For example, user authentication system 120 may include a MICROSOFT® PASSPORT system.

Software assistant 140 is configured to enable a user to download products purchased on multi-merchant purchasing system 100. Software assistant 140 is typically implemented as an application on a user's computing device. Software assistant 140 interacts with locker module 105 to determine which downloadable products are available for downloading and the locations at which the products can be downloaded. Software assistant 140 is configured to download the products at the determined locations, which are typically maintained by merchant services 131-133. Software assistant 140 is also configured to calculate a hash of a downloaded product for authentication purposes. For example, the hash may be compared with another hash determined by the merchant service that provided the product to determine whether the downloaded product is valid. The downloaded product may be invalid due to a variety of reasons, such as data corruption, substitution, hacking, or the like. The comparison may be performed by software assistant 140 or multi-merchant purchasing system 100.

Software assistant 140 is also configured to install downloaded products into the user's computing device. In one embodiment, software assistant 140 is configured to interact with locker module 105 to automatically download and install the purchased products associated with a computer device. In this manner, the computer device may be automatically imaged with the purchased products with minimum effort by the user.

Merchant services 131-133 are configured to receive transactional information from multi-merchant purchasing system 100 and to perform operations related to purchasing of downloadable products offered by the merchants. Merchant services 131-133 may be configured to provide any type of downloadable products, such as software, music, videos, graphics, or other type of digital content. The merchants corresponding to merchant services 131-133 may include any type of entities, such as producers of the downloadable products, online retailers, resellers, or the like. In particular, merchant service 131-133 may also be configured to serve as catalog providers.

Each of the merchant services 131-133 is configured to use payment information received form multi-merchant purchasing system 100 to arrange for payment for the downloadable products. In particular, each of the merchant services 131-133 is configured to receive from multi-merchant purchasing system 100 encrypted credit card numbers to process payments. Each of the merchant services 131-133 processes a private key provided by multi-merchant purchasing system 100 to decrypt the credit card numbers that are encrypted by credit card quarantine module 111.

After receiving payment, merchant services 131-133 are configured to provide multi-merchant purchasing system 100 with purchasing information, such as software licenses, receipt, shipping tracking number, downloading location, activation keys, or the like. Merchant services 131-133 may be configured to make the product available to the user for downloading in any manner, such as through downloading manager 140. Merchant services 131-133 may be configured to provide a hash value of the downloaded product for verification.

Catalog providers 150, merchant services 131-133, modules of multi-merchant purchasing system 100, software assistant 140 and user authentication system 120 may be implemented as any type of applications, such as web services. The term "web service" or "application service" means an application that is capable of interacting with other applications through one or more protocols, such as network protocols. Typically, web services are configured to send data to and receive data from applications through any type of networks. A web service may be identified by an identifier, such as an Internet Protocol (IP) address or a Uniform Resource Locator (URL), so that other applications can readily locate and communicate with the web service.

Web services may also be configured to facilitate communication between applications that are executing on difference types of devices and operating environments. Web services may communicate with other applications using various universal standards. For example, web services may use Extensible Markup Language (XML) to tag data, Simple Object Access Protocol (SOAP) to transfer the data, Web Services Description Language (WSDL) to describe the services available, or Universal Description, Discovery and Integration (UDDI) to list what services are available. The web services may be implemented in any type of software code, such as XML.

Figure 2:
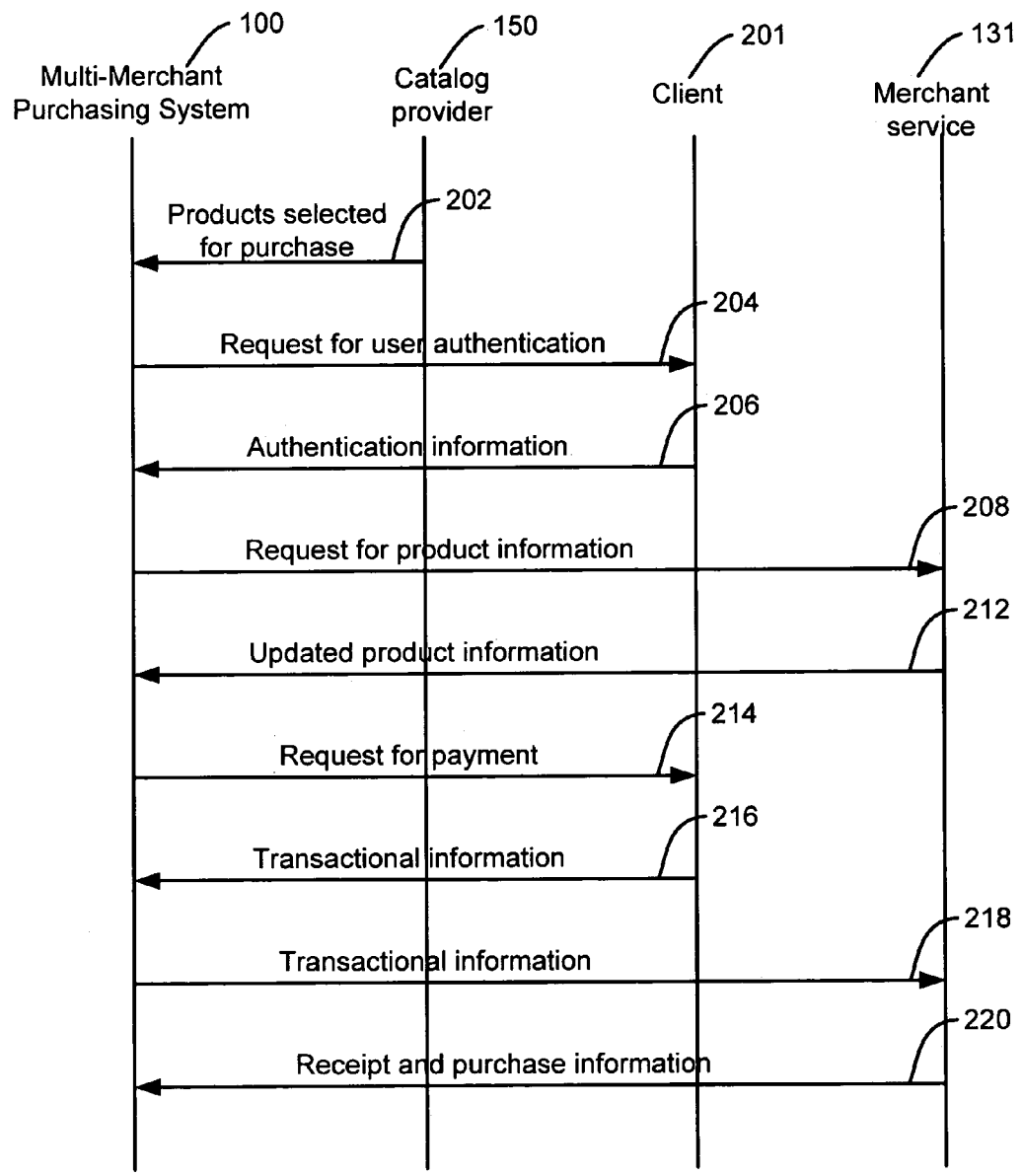
FIG. 2 illustrates example communications associated with purchasing downloadable products with the multi-merchant purchasing system shown in FIG. 1.

FIG. 2 illustrates example communications associated with purchasing downloadable products with multi-merchant purchasing system 100 shown in FIG. 1. For the purpose of discussion, a user has selected downloadable products through catalog provider 150 from a number of merchants, which include the merchant that corresponds to merchant service 131.

When the user chooses to purchase the downloadable products in the shopping cart, catalog provider 150 may send message 202 to multi-merchant purchasing system that includes the shopping cart information. The shopping cart information may include information about the products, such as serial numbers, the merchants associated with the products, description, prices, or the like. In response, multi-merchant purchasing system 100 may send message 204 to client 201 associated with the user that includes a request for user authentication. Multi-merchant purchasing system 100 may perform user authentication with client 201 or another computing device that includes a user authentication system. In response, client 201 (or the other computing device) may send message 206 that includes authentication information of the user.

Multi-merchant purchasing system 100 may send message 208 that includes a request for product information to merchant service 131. Message 208 may be sent if the product information determined by multi-merchant purchasing system 100 is not valid or has expired. In response, merchant service 131 may send message 212 that includes updated product information. Multi-merchant purchasing system 100 may present the information to the user prior to finalizing the purchase.

Multi-merchant purchasing system 100 may send message 214 to the client to request for payment. In response, client 201 may send message 216 that includes transactional information. The transactional information may include payment information, such as a credit card number, expiration date, security code, name, home address, phone number, or the like. The transactional information may also include other purchase-related information, such as shipping address, instructions, or the like. Message 216 may not be necessary if the multi-merchant purchasing system 100 has such transactional information from prior interaction with the user and is authorized to provide such information to merchants. Multi-merchant purchasing system 100 may send message 218 that includes transactional information to merchant service 131. After performing payment related transactions, merchant service 131 may send message 220 that includes a receipt and purchase information associated with the purchased products. For example, the purchase information may include licensing information, warranty information, shipping information, downloading location, or the like.

For illustrative purposes, only communications with a single merchant are shown for this purchase. It is to be appreciated that the purchase may include downloadable products from multiple merchants and communications with these merchants may be performed similar to those illustrated in FIG. 2.

Figure 3:
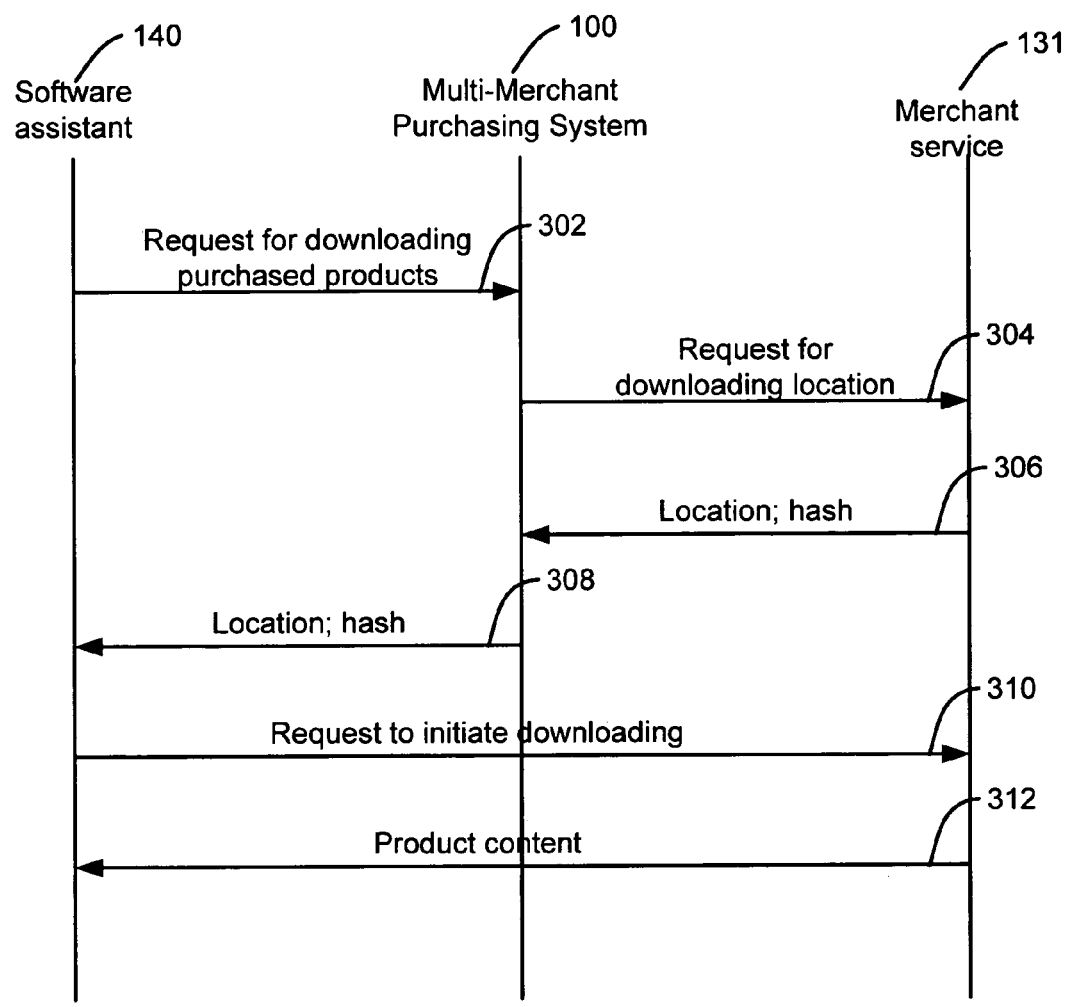
FIG. 3 illustrates example communications associated with downloading products that are purchased through the multi-merchant purchasing system 100 shown in FIG. 1.

FIG. 3 illustrates example communications associated with downloading products that are purchased through multi-merchant purchasing system 100 shown in FIG. 1. A user may employ a software assistant 140 to obtain the downloadable products. Software assistant 140 may send message 302 that includes a request for downloading purchased products to multi-merchant purchasing system 100. In response, multi-merchant purchasing system 100 may send message 304 that includes a request for downloading location to merchant service 131.

Merchant service 131 may send message 306 that includes a downloading location for the purchased products and a hash value associated with the products. The location may include an address, such as a Universal Resource Locator (URL), an Internet Protocol (IP) address, or the like. Multi-merchant purchasing system 100 may send message 308 with the downloading location and the hash value to software assistant 140. Software assistant 140 may send message 310 that includes a request to initiate downloading. In response, merchant service 312 may provide the product content in message 312.

After receiving the product content, software assistant 140 may calculate a hash value from the content and compare the calculated hash value with the value received in message 308. If the hash values do not match, the received content would be determined to have been compromised and would be invalidated. The communications in FIG. 3 show that software assistant 140 is configured to compare the hash values. It is to be appreciated that the software assistant 140 may also be configured to provide the calculated hash to multi-merchant purchasing system 100 for comparison.

Figure 4:
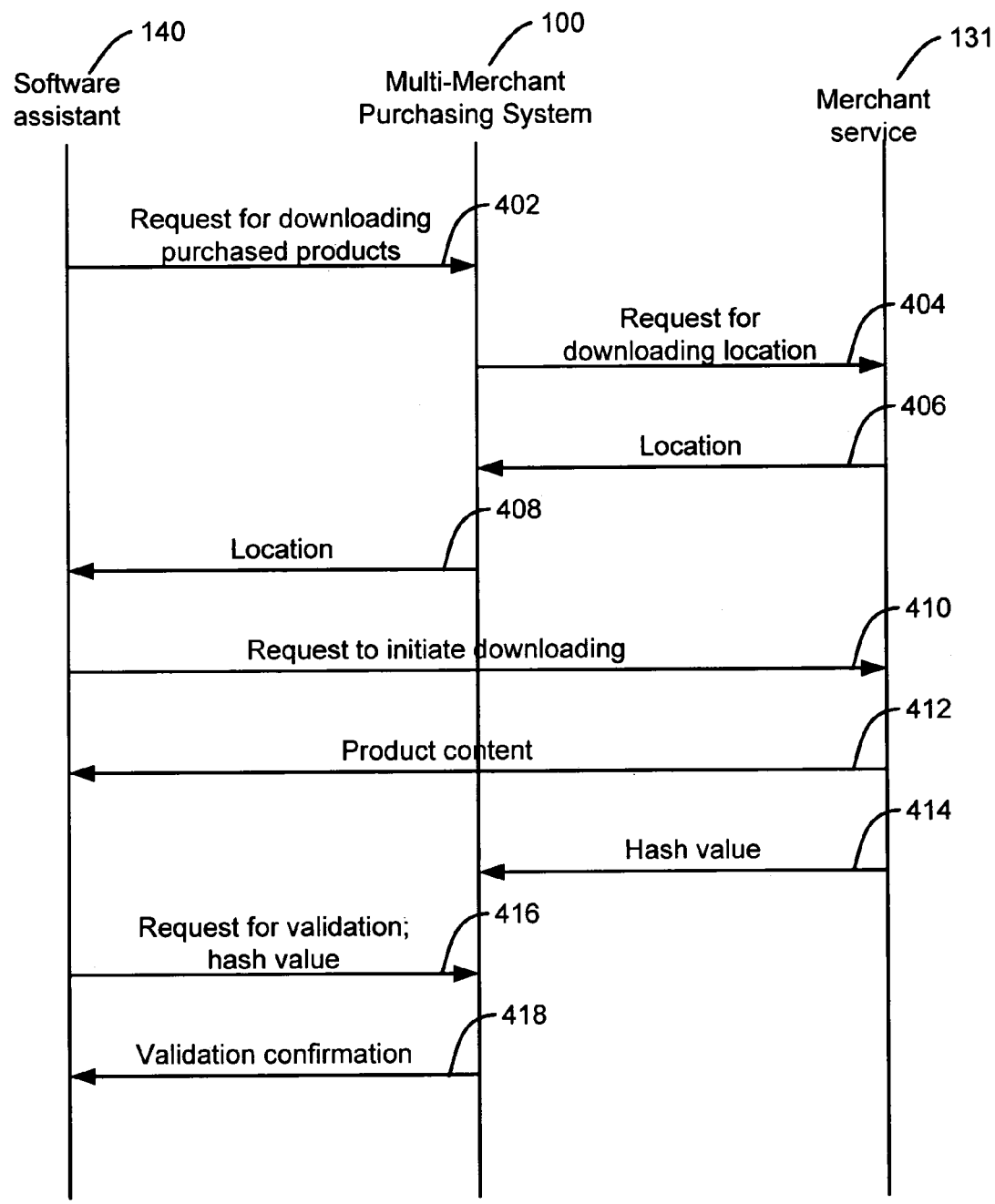
FIG. 4 illustrates another set of example communications associated with downloading purchased products.

FIG. 4 illustrates another set of example communications associated with downloading purchased products. The example communications shown in FIG. 4 are somewhat similar to the example communication shown in FIG. 3. The differences in the communications account for the fact that merchant service 131 does not provide the hash value at the time the downloading location is provided.

As shown in FIG. 4, software assistant 140 may send message 402 that includes a request for downloading purchased products to multi-merchant purchasing system 100. In response, multi-merchant purchasing system 100 may send message 404 that includes a request for downloading location to merchant service 131.

Merchant service 131 may send message 406 that includes a downloading location for the purchased products. Multi-merchant purchasing system 100 may send message 408 with the downloading location to software assistant 140. Software assistant 140 may send message 410 that includes a request to initiate downloading. In response, merchant service 412 may provide the product content in message 412.

After providing the product content to software assistant 140, merchant service 131 may send message 414 that includes a hash value associated with the product content to multi-merchant purchasing system 100. Software assistant 140 may calculate a hash value from the product content received in message 412 and send message 416 that includes the calculated hash value and a request for validation to multi-merchant purchasing system 100. Multi-merchant purchasing system 100 may compare the hash values received in message 414 and message 416. If the hash values match, multi-merchant purchasing system 100 may send message 418 that includes a validation confirmation to software assistant 140.

The communications in FIG. 4 show that multi-merchant purchasing system 100 is configured to compare the hash values. It is to be appreciated that multi-merchant purchasing system 100 may also be configured to provide the hash value received in message 414 to software assistant 140 for comparison.

Figure 5:
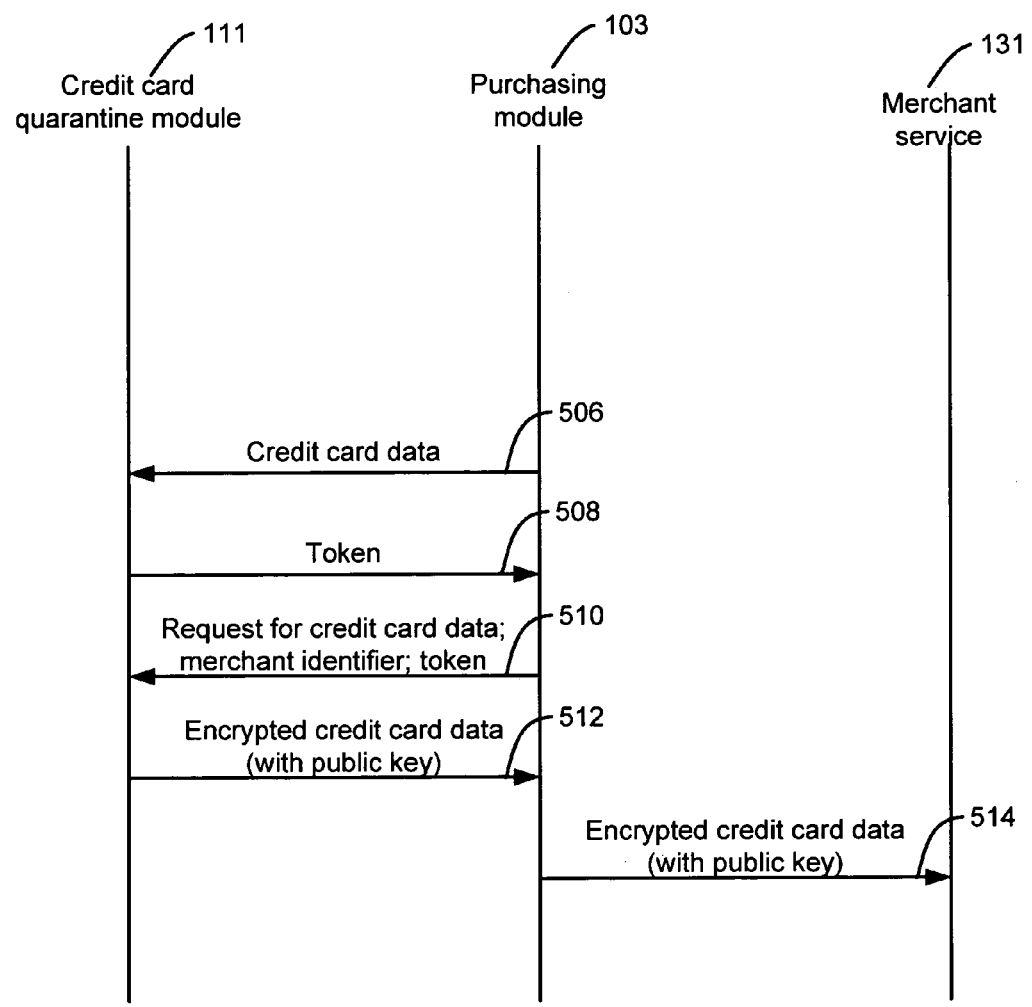
FIG. 5 illustrates example communications for securely sending credit card numbers from a credit card quarantine module to a merchant service.

FIG. 5 illustrates example communications for securely sending credit card numbers from credit card quarantine module 111 to merchant service 131. To prepare for secured transfer of credit card numbers, credit card quarantine module 111 and merchant service 131 may establish a public/private key arrangement so that communications between quarantine module 111 and merchant service 131 may be encrypted.

When the purchasing module 103 receives credit card data, such as a credit card number and related information, purchasing module 103 sends message 506 to credit card quarantine module 111 with the credit card data. In response, the credit card quarantine module 111 may return a token to represent the credit card data to purchasing module 103 with message 508.

When the purchasing module 103 determines to send the credit card data to merchant service 131, the purchasing module 103 may send message 510 that includes a request for credit card data along with the identity of the merchant to which the data will be sent and the token corresponding to the credit card data. In response, credit card quarantine module 111 may send message 512 that includes the requested credit card data encrypted with a public key corresponding to the merchant. Purchasing module 103 may send message 514 that includes the encrypted credit card data to merchant service 131. The merchant service may decrypt the credit card data using the corresponding private key.

The example communications in FIG. 2-5 may be structured in any manner, such as encoded as web service communications. To enhance security, the example communications may also be encrypted using any encryption algorithms and methods. Thus, the content of the messages, such as credit card data, may be secured with multiple levels of encryption.

Figure 6:
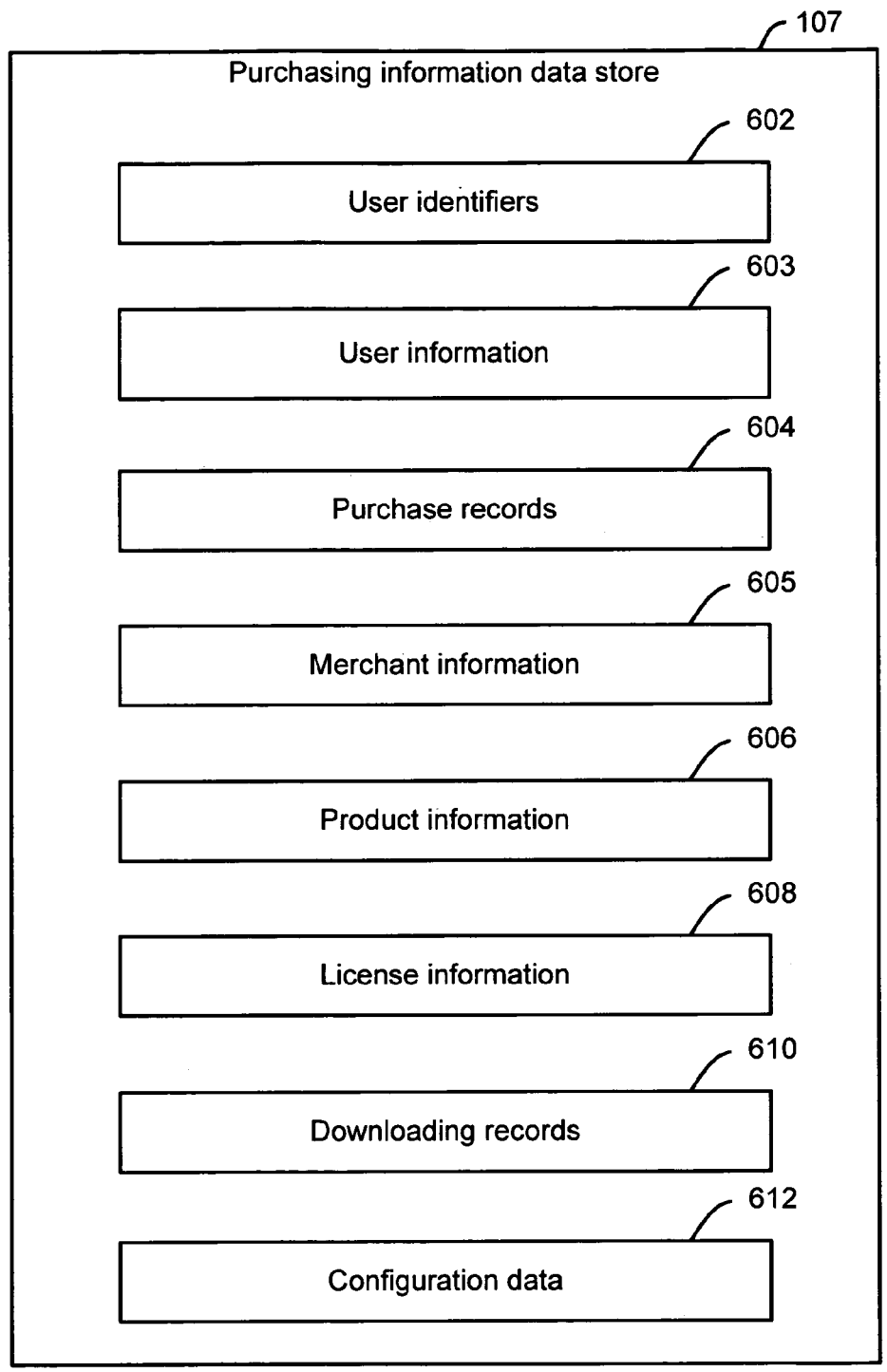
FIG. 6 shows example data that may be handled by the multi-merchant purchasing system shown in FIG. 1.

FIG. 6 shows example data that may be handled by multi-merchant purchasing system 100 shown in FIG. 1. The example data in FIG. 6 is shown to be included in purchased information data store 107. The example data may also be included in any data structure and communications between multi-merchant purchasing system 100 and other components, such as merchant services 131-133 and software assistant 140 shown in FIG. 1.

As shown in FIG. 6, purchasing information data store 107 may include user identifiers 602, user information 603, purchase records 604, merchant information 605, production information 606, license information 608, downloading records 610, and configuration data 612.

User identifiers 602 identify users that are associated with multi-merchant purchasing system 100. User identifiers 602 may serve as an indexing field for structuring other data in the data store 107. User information 603 includes information about each user identified by user identifiers 602. User information 603 may include personal information, such as name, address and phone number, payment information, or the like.

Purchase records 604 include records of purchases made by the users indicated by user identifiers 602. Each entry of the purchase records 604 may include a transaction number, date and time, a list of products, prices, or the like. Purchase records 604 may serve as an indexing field for structuring other data related to purchases. Merchant information 605 may include information about the merchant from which downloadable products were purchased in a particular transaction indicated in purchase records 604. Product information 606 may include detail information about the purchased products. License information 608 includes data about the licenses of the purchased products. For example, license information may include license numbers, keys, descriptions, restrictions, or the like. Downloading records 610 may include records of downloading event for products of each purchase. Configuration data 612 may include configurations of purchased products for a computing device associated with each user indicated in user identifiers 602. Configuration data 612 may be used to automatically image a user's computing device with downloadable products purchased through multi-merchant purchasing system 100.

Figure 7:
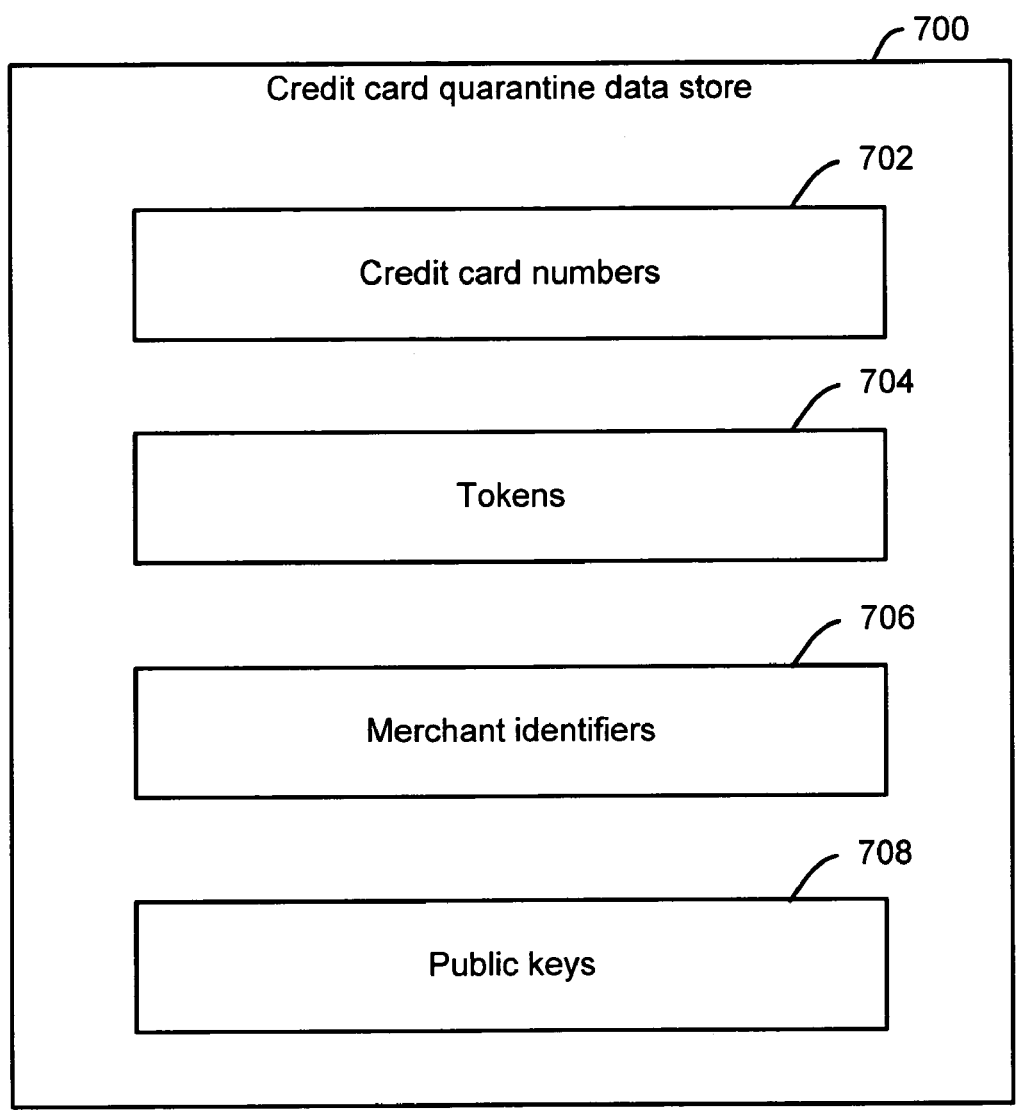
FIG. 7 shows example data that may be handled by the credit card quarantine module in FIG. 1.

FIG. 7 shows example data that may be handled by credit card quarantine module 111 in FIG. 1. As shown in FIG. 7, the example data may be included in credit card quarantine data store 700. The example data may include credit card numbers 702, tokens 704, merchant identifiers 706 and public keys 708. Tokens 704 are associated with credit card numbers 702. Each of the tokens 704 may be provided to another component, such as purchasing module 103 in FIG. 1, to reference a corresponding number in credit card numbers 702. Public keys 708 are associated with merchant identifiers 706. Each of the public keys 708 is used to encrypt credit card numbers before the numbers are transmitted to the merchant corresponding to one of the merchant identifiers 706.

Figure 8:
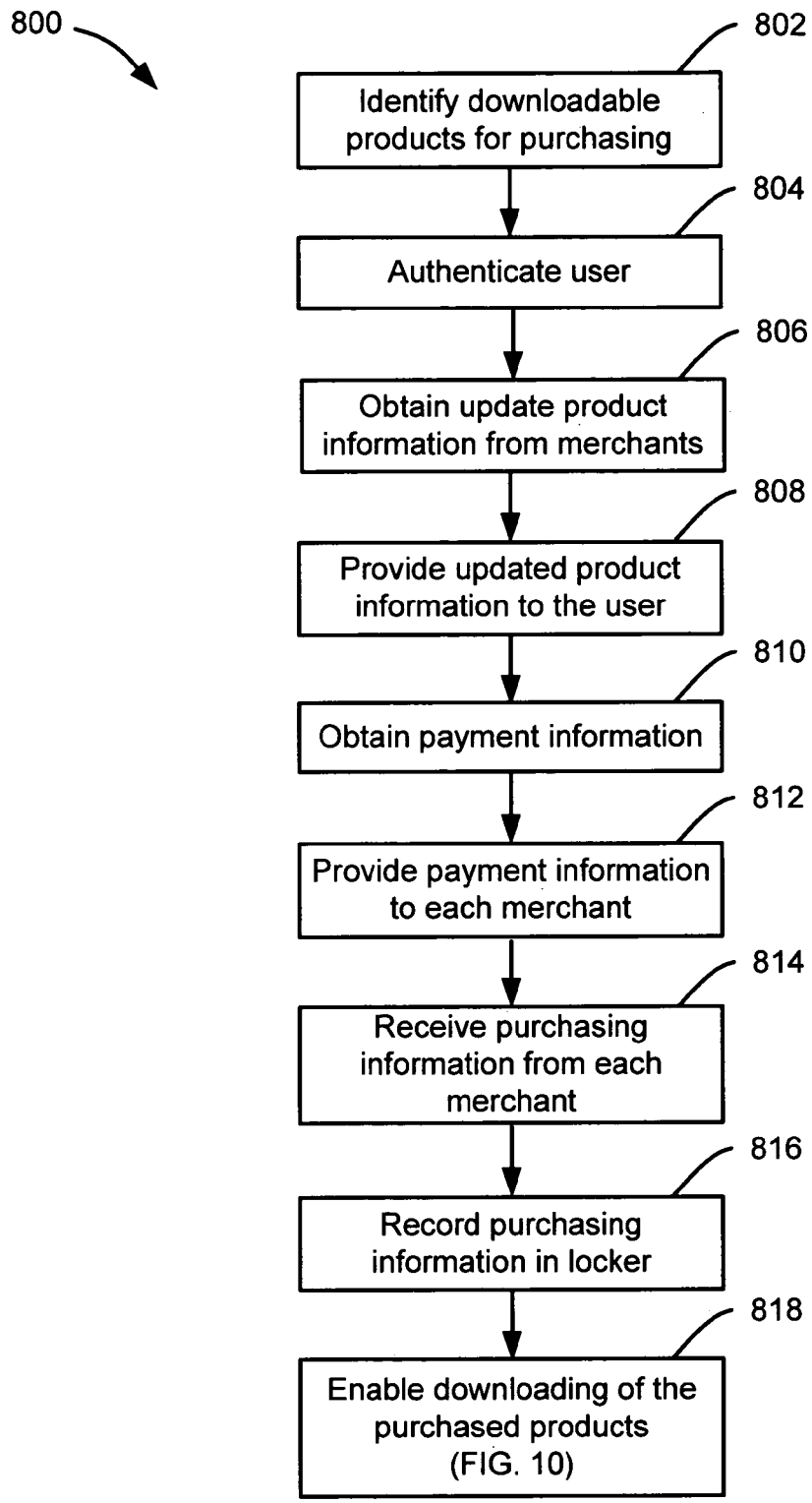
FIG. 8 shows an example process for enabling a user to make a purchase in a multi-merchant purchasing environment.

FIG. 8 shows an example process 800 for enabling a user to make a purchase in a multi-merchant purchasing environment. For example, process 800 may be implemented by a multi-merchant purchasing system to allow a user to purchase downloadable products from multiple merchants with a single transaction. At block 802, the downloadable products for purchasing are identified. The downloadable products may be identified from data provided by one or more catalog providers. At block 804, the user who is purchasing the downloadable products is authenticated. At block 806, updated product information about the downloadable products is obtained from merchants that offer the downloadable products. At block 808, the updated product information is provided to the user. At block 810, payment information is obtained. The payment information may be provided by the user or may be retrieved from a data store that contains the information, such as if the user has already provided the information in a previous purchase.

At block 812, payment information is provided to each merchant by which the downloadable products to be purchased are offered. At block 814, purchasing information from each merchant is received. At block 816, the purchasing information is recorded in a locker associated with the user. At block 818, the user is enabled to download the purchased products.

Figure 9:
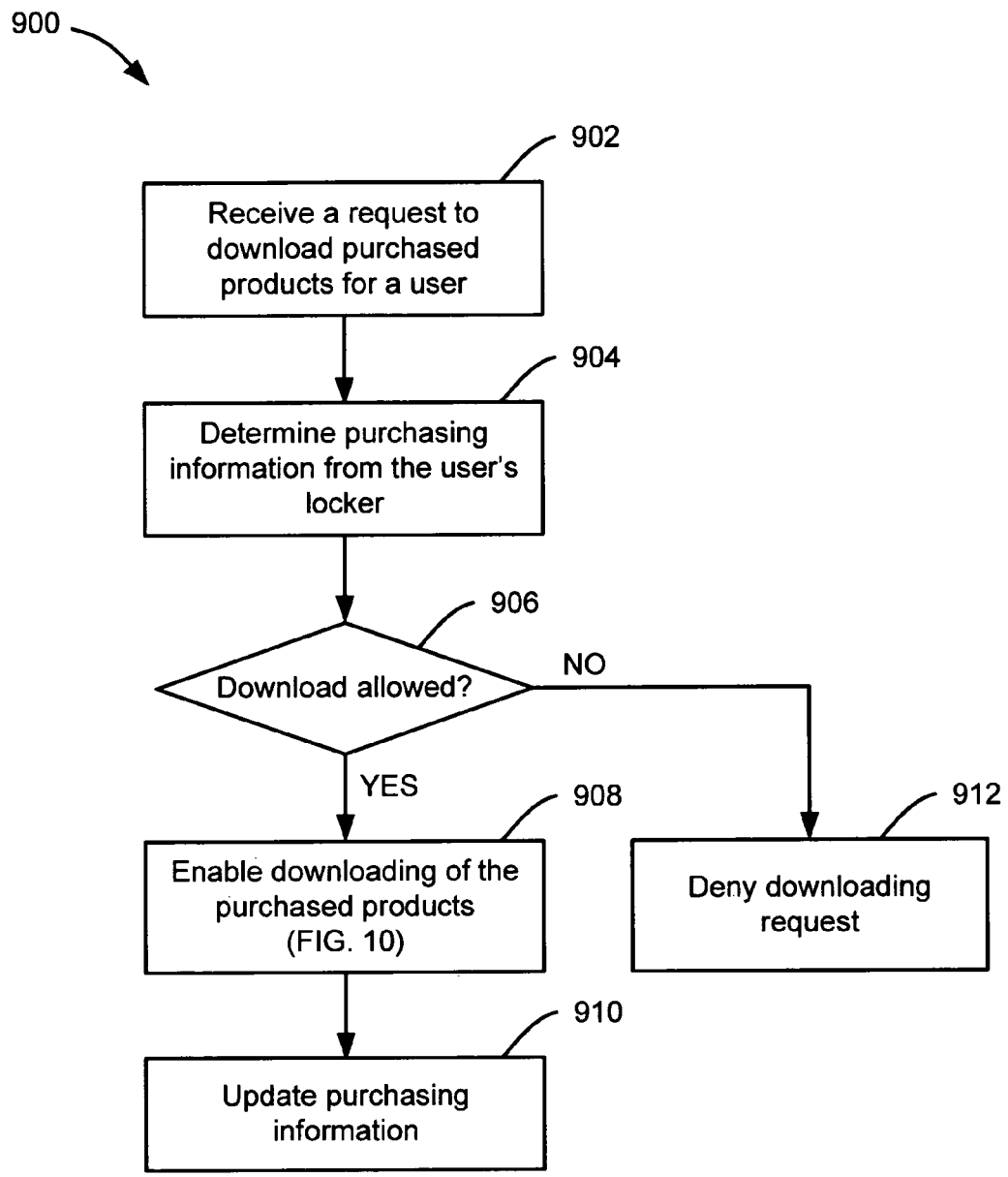
FIG. 9 shows an example process for enabling a user to download products that are properly purchased.

FIG. 9 shows an example process 900 for enabling a user to download products that are properly purchased. Process 900 may be implemented by a multi-merchant purchasing system to interact with a software assistant in a user's computing device. At block 902, a request to download purchased products for a user is received from a software assistant. The purchased products may be provided by different merchants. The request may be for downloading the purchased products for the first time or for a repeated downloading. At block 904, purchasing information from the user's locker is determined. At decision block 906, a determination is made whether downloading is allowed. The determination may be determined based on the licenses of the purchased products. If downloading is not allowed, process 900 moves to block 912 where the downloading request is denied.

Returning to decision block 906, if downloading is allowed, process 900 moves to block 908 where the user is enabled to download the purchased products. At block 910, the purchasing information is updated to reflect the downloading.

Figure 10:
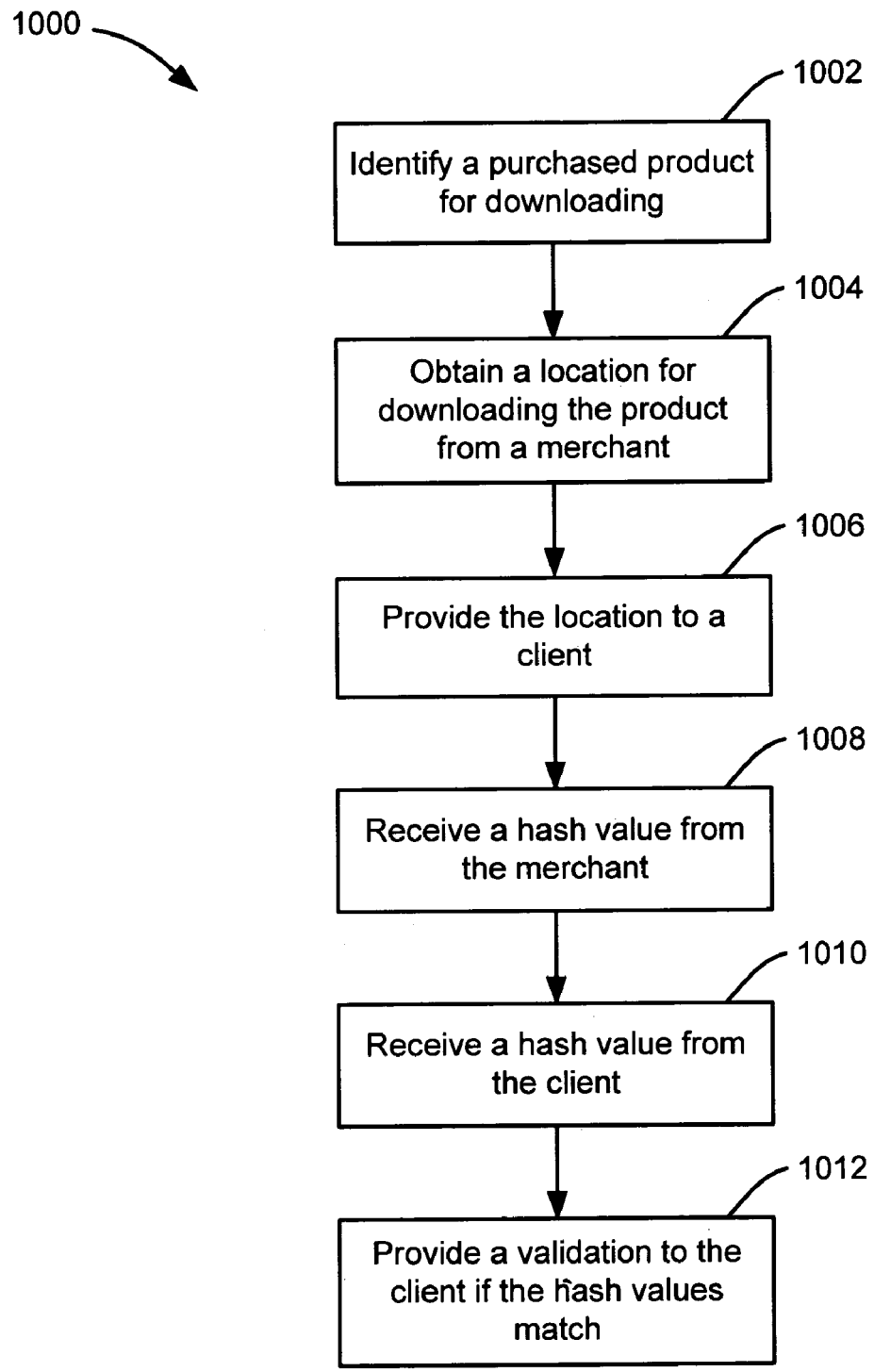
FIG. 10 shows an example process for downloading a downloadable product purchased through a multi-merchant purchasing system.

FIG. 10 shows an example process 1000 for downloading a downloadable product purchased through a multi-merchant purchasing system. At block 1002, the purchased product for downloading is identified. At block 1004, a location for downloading the product is obtained from the merchant by which the product is provided. The location typically includes a URL, IP address, or other identifier of a location in a network.

At block 1006, the location is provided to a client that requests the downloading. At block 1008, a hash value derived from the product for downloading is received from the merchant. At block 1010, another hash value calculated by the client is received from the client. At block 1012, a validation is provided to the client if the hash values match.

Figure 11:
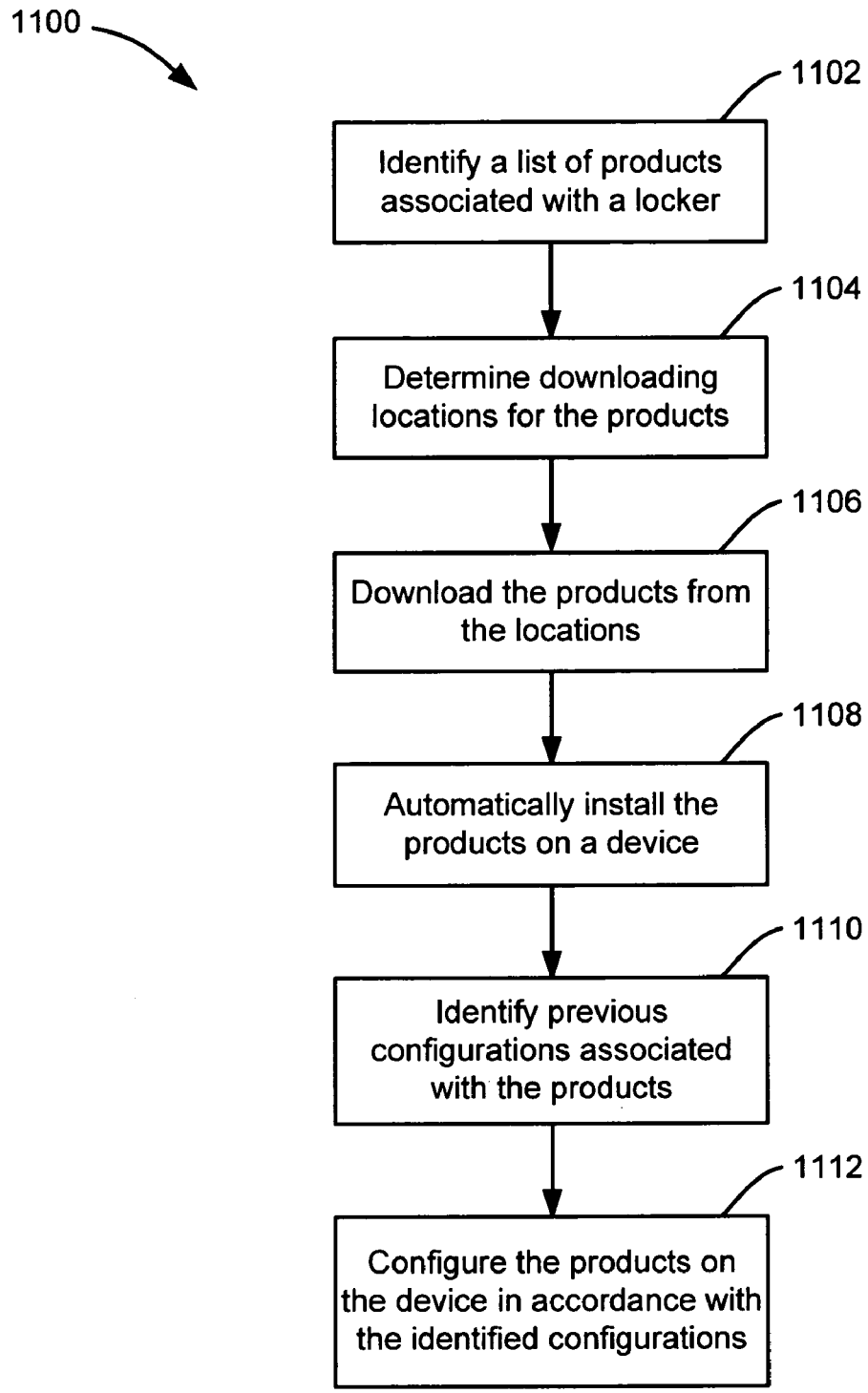
FIG. 11 shows an example process for downloading and installing downloadable product purchased through a multi-merchant purchasing system.

FIG. 11 shows an example process 1100 for downloading and installing product purchased through a multi-merchant purchasing system. Process 1100 may be implemented by a software assistant. At block 1102, a list of products associated with a locker on the multi-merchant purchasing system. The locker is typically associated with a user. The products may be provided by multiple merchants. At block 1104, downloading locations for the products are determined. Each location corresponds to a service of a merchant that provides at least one of the products. At block 1106, the products are downloaded from the locations. At block 1108, the products are automatically installed on the computing device associated with the user.

For repeated downloading, the steps in blocks 1110 and 1112 may be used to configure the downloaded products. At block 1110, previous configurations associated with the products are identified. At block 1112, the products on the device are configured in accordance with the identified configurations. The steps in blocks 1110 and 1112 may be used to automatically image the computing device with software and data that are purchased from the multi-merchant purchasing system.

Figure 12:
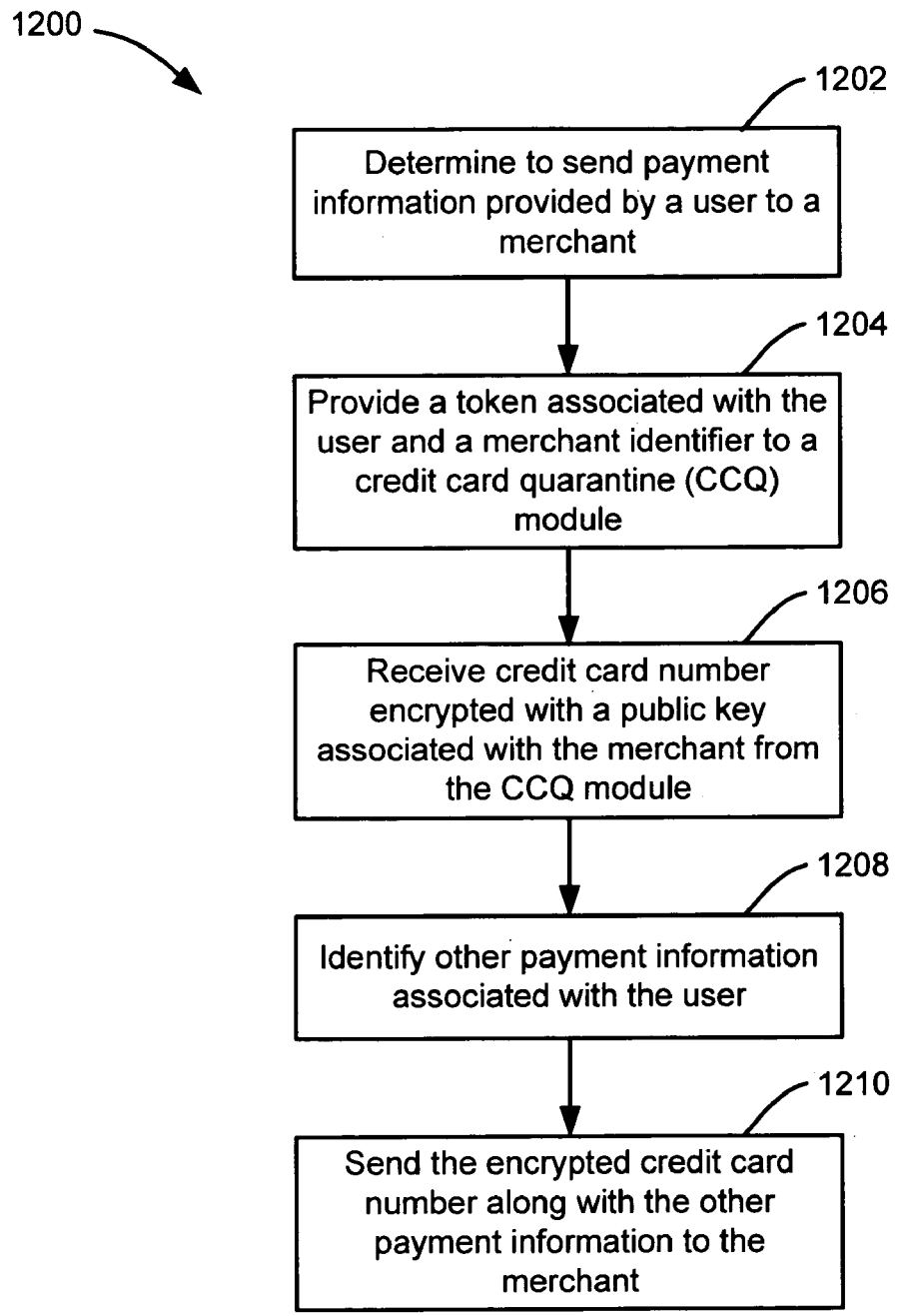
FIG. 12 shows an example process for securely providing payment information to a merchant for purchasing downloadable products through a multi-merchant purchasing system.

FIG. 12 shows an example process 1200 for securely providing payment information to a merchant for purchasing downloadable products through a multi-merchant purchasing system. At block 1202, the process determines to send payment information provided by a user to a merchant. At block 1204, a token associated with the user and a merchant identifier is provided to a credit card quarantine module. At block 1206, credit card number encrypted with a public key associated with the merchant indicated by the merchant identifier is received from the credit card quarantine module. At block 1208, other payment information associated with the user is identified. For example, the other payment information may include a name, address, expiration date, security code, phone number, address, or the like. At block 1210, the encrypted credit card number is sent to the merchant along with the other payment information.

Figure 13:
FIG. 13 is a screenshot of an example user interface provided by a catalog provider for purchasing downloadable products from multiple merchants.

FIG. 13 is a screenshot 1300 of an example user interface provided by a catalog provider for purchasing downloadable products from multiple merchants. As shown in example screenshot 1300, a shopping cart associated with a user is presented. The shopping cart includes downloadable products from two different merchants. The user may proceed to purchase the downloadable product with a multi-merchant purchasing system by activating checkout button 1302.

Figure 14:
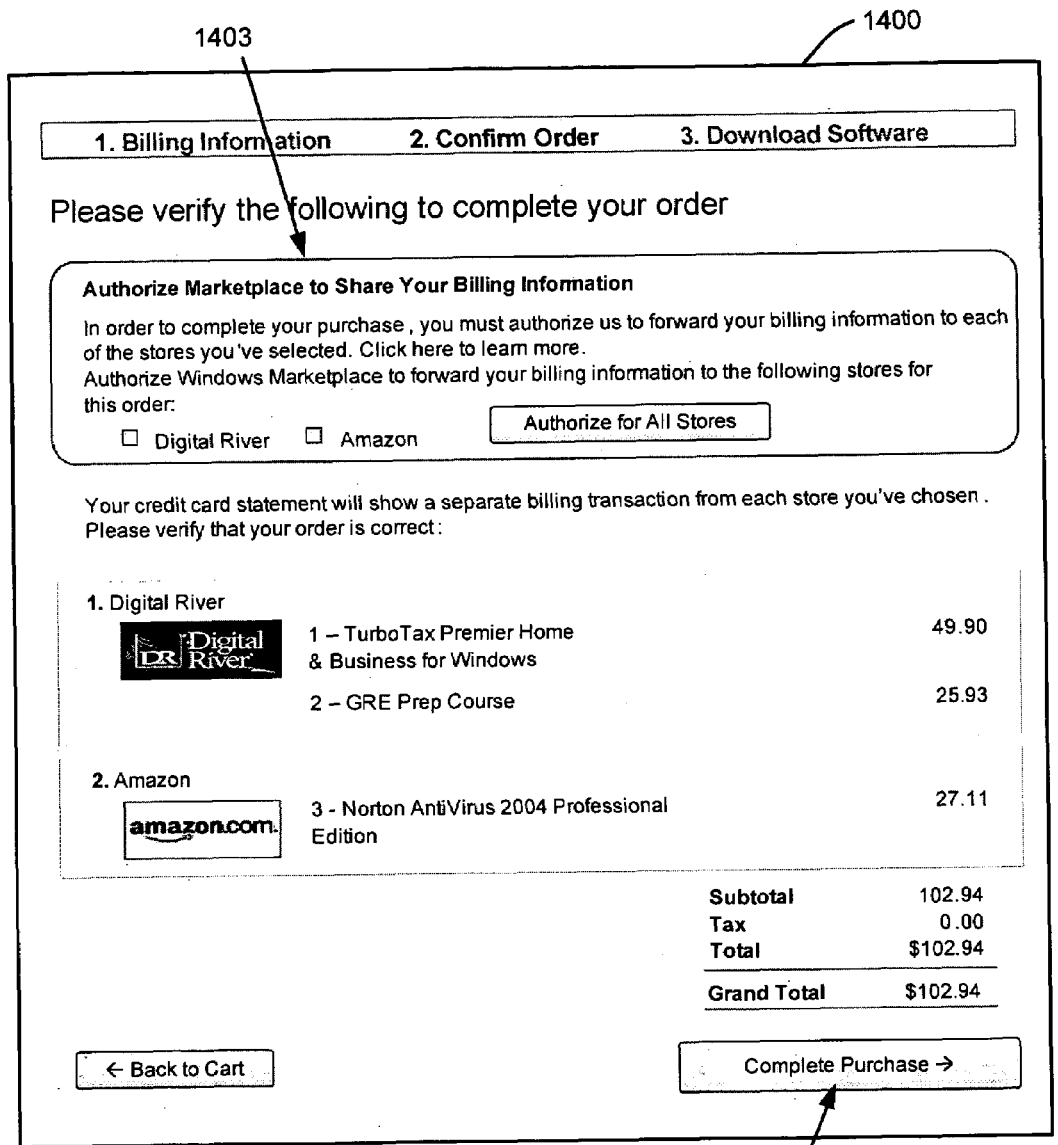
FIG. 14 is a screenshot of an example user interface for purchasing downloadable products through a multi-merchant purchasing system.

FIG. 14 is a screenshot 1400 of an example user interface for purchasing products through a multi-merchant purchasing system. As shown in FIG. 14, the products from multiple merchants illustrated in FIG. 13 are listed for the user. The information may include updated information, such as prices, description, or the like, provided by each merchant. An authorization selection area 1403 is provided to show the user that the payment information will be provided to each merchant for processing and to enable the user to provide authorization. The user may provide the necessary authorization in area 1403 and complete the purchase by activating the complete purchase button 1405. Upon activation, the payment information and other transactional information would be provided to each merchant for processing.

FIG. 15 is a screenshot 1500 of an example user interface for managing downloadable products newly purchased through a multi-merchant purchasing system. In area 1502, information about a purchase is presented. As shown in the figure, downloadable products from two different merchants are included in the purchase. In area 1504, the information about the purchased products is shown. The information includes license information associated with the downloadable products. Downloading times are also provided for review by the user. The user may select to start the downloading process by activating a download button 1506. Upon activation, a software assistant may be launched on the user's computing device to perform the downloading.

Figure 16:
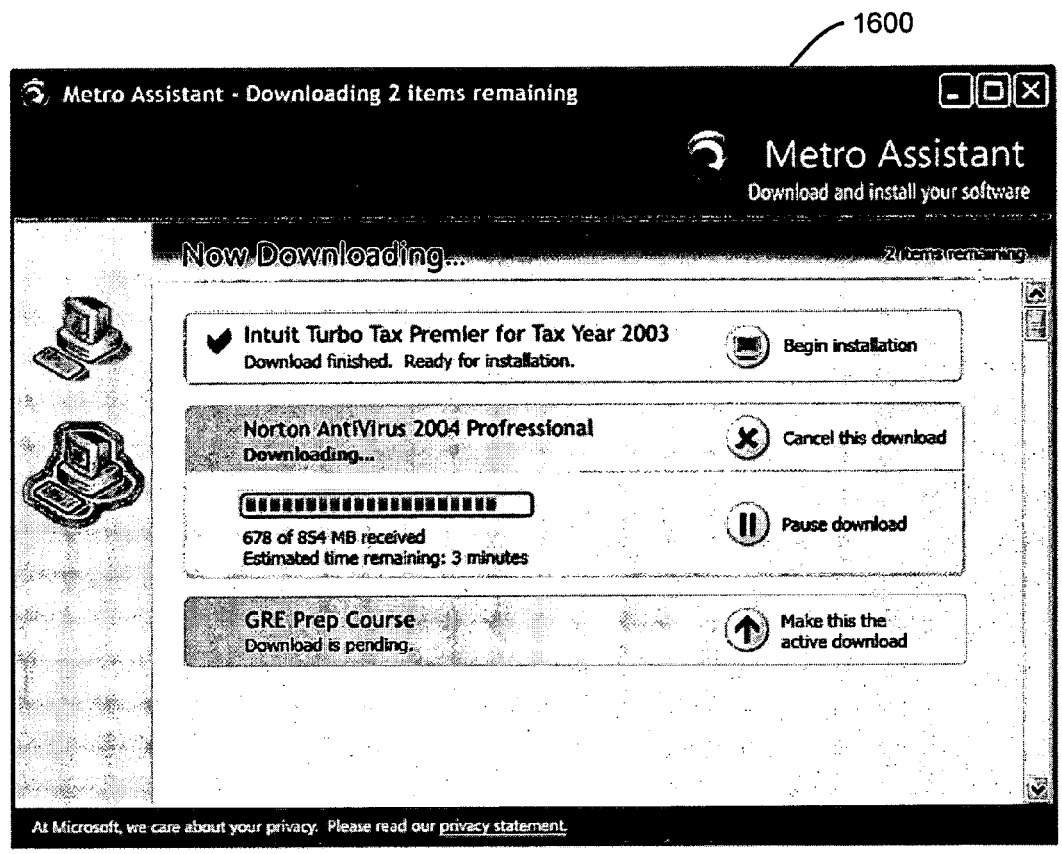
FIG. 16 is a screenshot of an example user interface provided by a software assistant for downloading and installing products purchased through a multi-merchant purchasing system.

FIG. 16 is a screenshot 1600 of an example user interface provided by a software assistant for downloading and installing products purchased through a multi-merchant purchasing system. The software assistant is typically a client process executing on the user's computing device. The software assistant typically interacts with the multi-merchant purchasing system to obtain information for downloading and with a merchant service to receive the actual product content. As shown in screenshot 1600, the software assistant may be configured to download multiple products from different merchants at the same time. The software assistant may also be configured to install the downloaded products.

Figure 17:
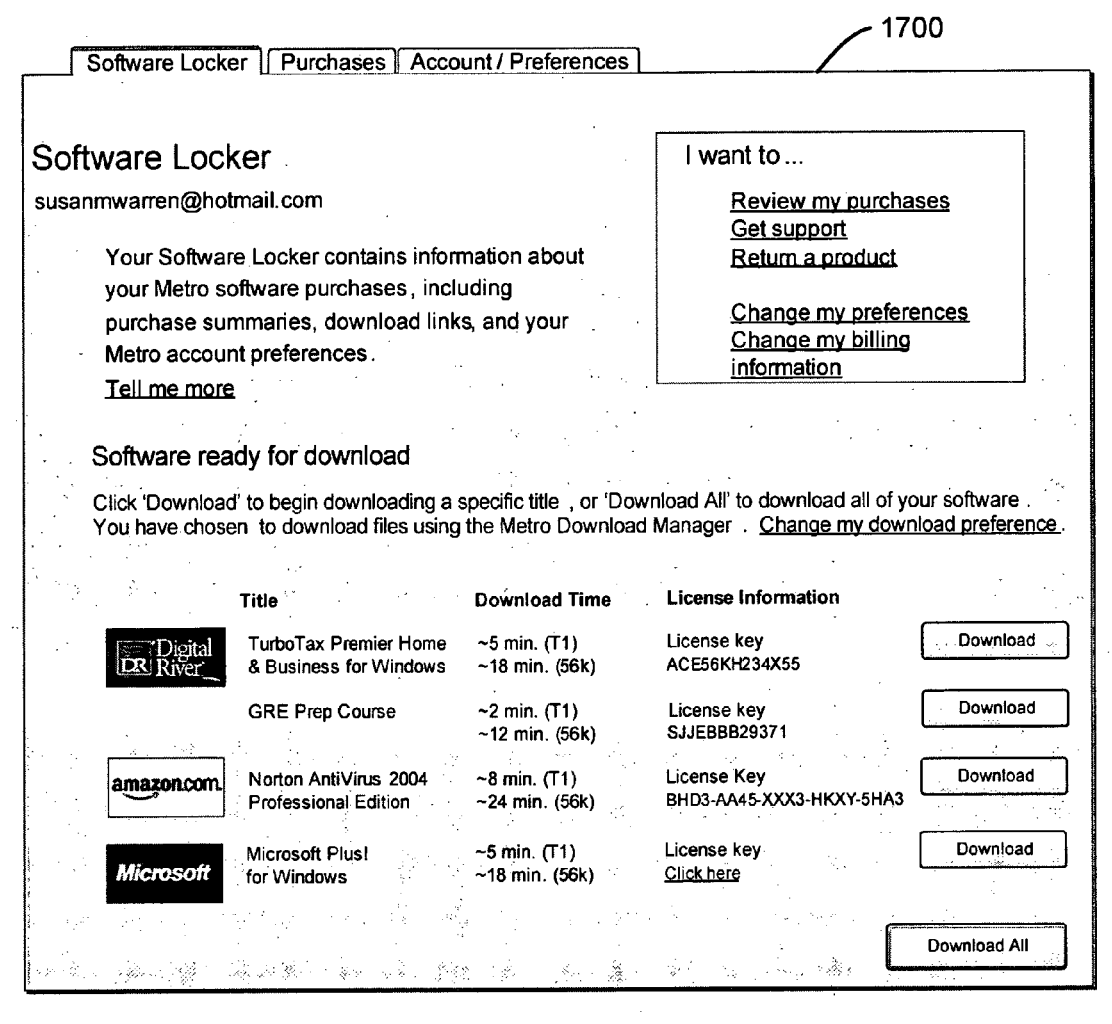

FIG. 17 is a screenshot 1700 of an example user interface provided by a locker of a multi-merchant purchasing system. The locker enables a user associated with the locker to access the downloadable products purchased through the multi-merchant purchasing system. As shown in screenshot 1700, the locker may provide purchase information, such as a list of the purchased products, license information, downloading time, or other information. Depending on the licenses, the locker may also enable to the user to download the purchase products again after the initial download.

FIG. 18 is an example screenshot 1800 of a user interface provided by a multi-merchant purchasing system for a user to review purchases made with the system. As shown in FIG. 18, purchases from multiple merchants may be shown together. Also, links are available for obtaining additional information and support.

FIG. 19 is an example screenshot 1900 of a user interface provided by a multi-merchant purchasing system for a user to manage an account on the system. The user may provide and manage information required for making purchases. When making a purchase with downloadable products from multiple merchants, the provided information is forwarded to each merchant so that the user does not have to go through the purchasing process with each merchant.

Figure 20:
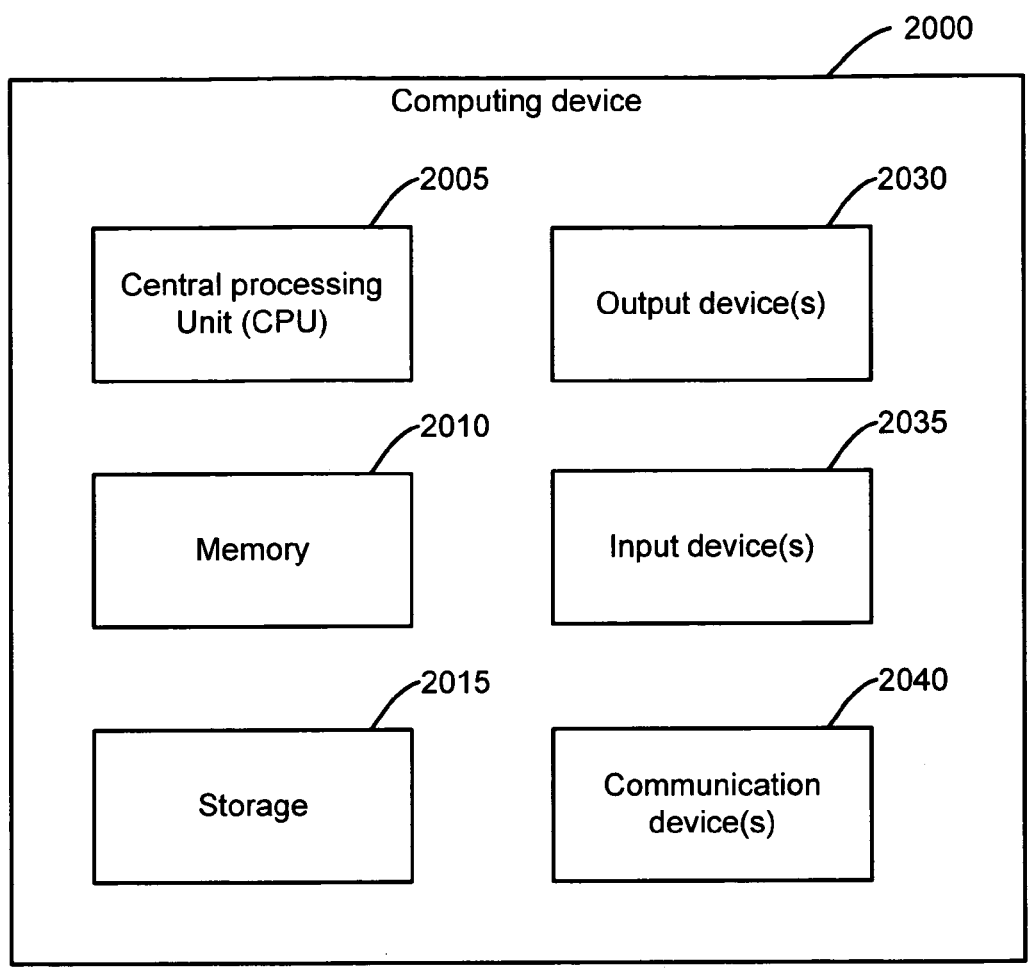
FIG. 20 shows an exemplary computer device for implementing the described systems and methods.

FIG. 20 shows an exemplary computer device 2000 for implementing the described systems and methods. In its most basic configuration, computing device 2000 typically includes at least one central processing unit (CPU) 2005 and memory 2010.

Depending on the exact configuration and type of computing device, memory 2010 may be volatile (such as RAM), non-volatile (such as ROM, flash memory, etc.) or some combination of the two. Additionally, computing device 2000 may also have additional features/functionality. For example, computing device 2000 may include multiple CPU's. The described methods may be executed in any manner by any processing unit in computing device 2000. For example, the described process may be executed by both multiple CPU's in parallel.

Computing device 2000 may also include additional storage (removable and/or non-removable) including, but not limited to, magnetic or optical disks or tape. Such additional storage is illustrated in FIG. 20 by storage 2015. Computer storage media includes volatile and nonvolatile, removable and non-removable media implemented in any method or technology for storage of information such as computer readable instructions, data structures, program modules or other data. Memory 2010 and storage 2015 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 2000. Any such computer storage media may be part of computing device 2000.

Computing device 2000 may also contain communications device(s) 2040 that allow the device to communicate with other devices. Communications device(s) 2040 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 2000 may also have input device(s) 2035 such as keyboard, mouse, pen, voice input device, touch input device, etc. Output device(s) 2030 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. One or more device-readable media having device-executable instructions which, when executed, cause one or more processors to perform the steps of:

storing by a security application running on a user computer, credit card information comprising a credit card identifier and providing by the security application a token to a purchasing application wherein the token is unique to the credit card identifier;

identifying a first product from the user computer, the first product being provided by a first merchant computer application;

adding the first product to a purchase list by the user computer; identifying a second product by the user computer, the second product being provided by a second merchant computer application, the second merchant being different from the first merchant; adding the second product to the purchase list by the user computer;

receiving a purchase instruction from a user, the purchase instruction indicating a request from the user to purchase all items on the purchase list, including the first product and the second product;

identifying by the purchasing application the token;

providing by the purchasing application the token to the security application;

providing by the purchasing application a first identifier associated with the first merchant to the security application;

providing by the purchasing application a second identifier associated with the second merchant to the security application;

retrieving, by the security application, based on the token, the credit card identifier from the stored credit card information; encrypting first credit card data by the security application using a first public key associated with the first merchant, the first credit card data including a credit card identifier; encrypting second credit card data by the security application using a second public key associated with the second merchant, the second credit card data including the credit card identifier;

sending, in response to the purchase instruction, the first encrypted credit card data to a first merchant application associated with the first merchant; and sending, in response to the purchase instruction, the second encrypted credit card data to a second merchant application associated with the second merchant.

2. The one or more device-readable media as recited in claim 1, wherein the device-executable instructions, when executed, cause the one or more processors to perform the steps of:

determining additional payment information associated with the user; and sending the additional payment information along with the first credit card data.

3. The one or more device-readable media as recited in claim 1, wherein the device-executable instructions, when executed, cause the one or more processors to perform the steps of:

substituting the token as credit card identifier in the credit card information;

and storing the credit card information in a data store.

4. The one or more device-readable media as recited in claim 1, wherein the device-executable instructions, when executed, cause the one or more processors to perform the step of:

receiving a request from the first merchant application to receive credit card information.

5. The one or more device-readable media as recited in claim 1, wherein the device-executable instructions, when executed, cause the one or more processors to perform the steps of:

requesting the user to provide an authorization for providing the first credit card data to the first merchant; and receiving the authorization from the user before sending the first credit card data to the first merchant application.

6. One or more device-readable media having device-executable instructions which, when executed, cause one or more processors to perform the steps of:
- storing a data structure by a user computer security application running on a user computer, the data structure including:
- a first data field including credit card information comprising a credit card identifier;
- a second data field indexed to the first data field, the second data field including a token wherein the token is unigue to the credit card identifier and, and is being used to substitute for a corresponding credit card data identifier in the first data field;
- a third data field including a plurality of merchant identifiers, each merchant identifier indicating a different merchant; and
- a fourth data field indexed to the third data field, the fourth data field including a first public key and a second public key wherein the public keys are associated with a corresponding merchant identifier in the third data field;
- providing by the security application the token to a purchasing application;
- identifying a first product from the user computer, the first product beinci provided by a first merchant computer application;
- adding the first product to a purchase list by the user computer;
- identifying a second product by the user computer, the second product being provided by a second merchant computer application, the second merchant being different from the first merchant;
- adding the second product to the purchase list by the user computer; receiving a purchase instruction from a user, the purchase instruction indicating a request from the user to purchase all items on the purchase list. including the first product and the second product;
- identifying by the purchasing application the token;
- providing by the purchasing application the token to the security application;
- providing by the purchasing application a first identifier associated with the first merchant to the security application;
- providing by the purchasing application a second identifier associated with the second merchant to the security application;
- retrieving, by the security application, based on the token, the credit card identifier from the stored credit card information;
- encrypting first credit card data by the security application using the first public key associated with the first merchant, the first credit card data including a credit card identifier;
- encrypting second credit card data by the security application using the second public key associated with the second merchant, the second credit card data including the credit card identifier;
- sending, in response to the purchase instruction, the first credit card data to a first merchant application associated with the first merchant; and
- sending, in response to the purchase instruction, the second credit card data to a second merchant application associated with the second merchant.

7. The one or more device-readable media recited in claim 6, wherein each public key in the fourth data field is configured to be usable to encrypt one of the one or more credit card data items in the first data field.

8. The one or more device-readable media as recited in claim 6, wherein one of the one or more credit card data items includes at least one of a credit card number, an expiration date, a name, an address, or a phone number.

9. A system for purchasing downloadable products comprising:
- one or more memories;
- one or more processors operable with the one or more memories to:
  - provide credit card numbers, each credit card number being associated with a token,
  - maintain public keys, each public key corresponding to a different merchant associated with the system,
  - encrypt at least one of the credit card numbers with at least one of the public keys,
- wherein the one or more processors are operable with the one or more memories for a single purchase request from a user to:
  - provide a token to the security application,
  - receive a first encrypted credit card number and a second encrypted credit card number, the first encrypted credit card number including a credit card number associated with the token encrypted with a first public key associated with a first one of the merchants, the second encrypted credit card number including the credit card number encrypted with a second public key associated with a second one of the merchants,
  - determine first payment information associated with the first encrypted credit card number,
  - determine second payment information associated with the second encrypted credit card number,
  - send the first payment information and the first encrypted credit card number to the first one of the merchants, and
  - send the second payment information and the second encrypted credit card number to the second one of the merchants.

10. The system as recited in claim 9, wherein the one or more processors are operable with the one or more memories to encrypt the first payment information and the first encrypted credit card number before sending to the merchant.

11. The system as recited in claim 9, wherein the one or more processors are operable with the one or more memories to prevent the credit card numbers from being sent without encryption.

12. The system as recited in claim 9, wherein the one or more processors are operable with the one or more memories to receive a merchant identifier and to determine a public key associated with the merchant identifier.

13. The system as recited in claim 12, wherein the one or more processors are operable with the one or more memones to encrypt messages with credit card numbers with the determined public key.

14. The system as recited in claim 13, wherein the one or more processors are operable with the one or more memories to send a private key associated with the determined public key to the merchant.

15. The system as recited in claim 9, wherein the one or more processors are operable with the one or more memories to provide a web service.

* * * * *